United States Patent [19]

Herb et al.

[11] Patent Number: 5,747,705

[45] Date of Patent: May 5, 1998

[54] METHOD FOR MAKING A THIN FILM RESONANT MICROBEAM ABSOLUTE

[75] Inventors: William R. Herb; David W. Burns. both of Minneapolis, Minn.

[73] Assignee: Honeywell Inc., Minneapolis, Minn.

[21] Appl. No.: 778,375

[22] Filed: Dec. 31, 1996

[51] Int. Cl.⁶ .................................................. G01L 1/10
[52] U.S. Cl. .................................................. 73/862.59
[58] Field of Search ........................... 73/702, 703, 704, 73/708, 774, 777, 778, 862.59, 517 AV, DIG. 1; 200/61 R, 61.45 R; 257/914, 700, 431; 156/653.1

[56] References Cited

U.S. PATENT DOCUMENTS

| | | | |
|---|---|---|---|
| 4,673,777 | 6/1987 | Bai et al. | 200/61.45 R |
| 4,744,863 | 5/1988 | Guckel et al. | 156/653.1 |
| 4,873,871 | 10/1989 | Bai et al. | 73/777 |
| 4,945,773 | 8/1990 | Sickafus | 73/862.59 |
| 5,165,289 | 11/1992 | Tilmans | 73/862.59 |
| 5,188,983 | 2/1993 | Guckel et al. | 73/862.59 |
| 5,417,115 | 5/1995 | Burns | 73/778 |
| 5,458,000 | 10/1995 | Burns et al. | 73/702 |
| 5,473,944 | 12/1995 | Kurtz et al. | 73/704 |
| 5,511,427 | 4/1996 | Burns | 73/708 |
| 5,550,516 | 8/1996 | Burns et al. | 331/65 |
| 5,559,358 | 9/1996 | Burns et al. | 257/431 |

*Primary Examiner*—William L. Oen
*Attorney, Agent, or Firm*—John G. Shudy, Jr.

[57] ABSTRACT

A micromechnical sensor having a polysilicon beam that is an integral part of the diaphragm resulting in a frequency of the beam that is a direct result of the pressure applied to the external surface of the diaphragm. Fabrication of this resonant microbeam sensor has no backside wafer processing, and involves a process and layout independent of wafer thickness for high yield and robustness. Both the diaphragm and resonant beam are formed from polysilicon. The sensor may have more than one resonant beam. The sensor beam or beams may be driven and sensed by electrical or optical mechanisms. For stress isolation, the sensor may be situated on a cantilevered single crystal silicon paddle. The sensor may be recessed on the isolating die for non-interfering interfacing with optical or electrical devices.

31 Claims, 10 Drawing Sheets

METHOD FOR MAKING A THIN FILM RESONANT MICROBEAM ABSOLUTE

The U.S. Government has certain rights in the present invention.

BACKGROUND OF THE INVENTION

The invention pertains to sensors and particularly to resonant sensors. More particularly, the invention pertains to resonant microbeam pressure sensors having a polysilicon microbeam resonator formed from a portion of the sensor diaphragm.

Previous developments have resulted in surface micromachined pressure sensors each of which had a pressure diaphragm formed from a deposited thin film of polysilicon with an integral vacuum cavity reference directly under the diaphragm. Deformations of the diaphragm with applied pressure caused shifts in a Wheatstone bridge fabricated from polysilicon piezoresistors deposited on the diaphragm resulting in a voltage output indicating the amount of pressure sensed by the sensor. The Wheatstone bridge has a relatively low sensitivity to strain in the diaphragm, and the output voltage requires an analog-to-digital (A/D) conversion to be used in digital systems.

Several patents provide background to the present description. U.S. Pat No. 4,744,863, by inventors Henry Guckel and David W. Burns, issued May 17, 1988, and entitled "Sealed cavity semiconductor pressure transducers and method of producing the same;" U.S. Pat. No. 5,417,115, by inventor David W. Burns, issued May 23, 1995, and entitled "Dielectrically isolated resonant microsensors;" U.S. Pat. No. 5,458,000, by inventors David W. Burns and J. David Zook, issued Oct. 17, 1995, and entitled "Static pressure compensation of resonant integrated microbeam sensors;" and U.S. Pat. No. 5,511,427, by inventor David W. Burns, issued Apr. 30, 1996, and entitled "Cantilevered microbeam temperature sensor" are hereby incorporated in this description by reference.

SUMMARY OF THE INVENTION

The present invention has an integral vacuum cavity reference and a polysilicon diaphragm, but has a polysilicon resonator integrally formed from a portion of the diaphragm, thus being able to provide a frequency output that is a direct measure of the pressure applied to the top surface of the diaphragm, thus eliminating the errors of the Wheatstone or other parameter transforming device deposited on the diaphragm which introduces errors into the results of the measured parameter. The output of the present micromachined sensor interfaces readily with digital and optical systems. The invention is a thin film resonant microbeam absolute pressure sensor that achieves the advantageous objectives of having an integral vacuum reference, a frequency output, high sensitivity and integral stress isolation. Fabrication of this microbeam sensor requires no backside wafer processing, involves a process and layout independent of wafer thickness, can use full thickness die for high yield and robustness, and the process is compatible with a family of resonant sensors (including temperature and strain).

The invention is a microstructure having a thin film diaphragm, at least one embedded resonator, and an integral vacuum reference. The diaphragm and resonator are formed from polysilicon. This sensor may utilize a sensing and driving mechanism that is either electrical or optical, or a combination of electrical and optical. The sensor may have a single resonant microbeam or a multiple of microbeams which may include push-pull operation for temperature cancellation or compensation.

For more precise sensing, the microbeam sensor may incorporate integral stress isolation using cantilevered single crystal silicon paddles. The sensor may be configured into a differential pressure sensor by a process that uses additional micromachining while retaining the resonator in its own vacuum reference.

DESCRIPTION OF PREFERRED EMBODIMENTS

Figure 1:
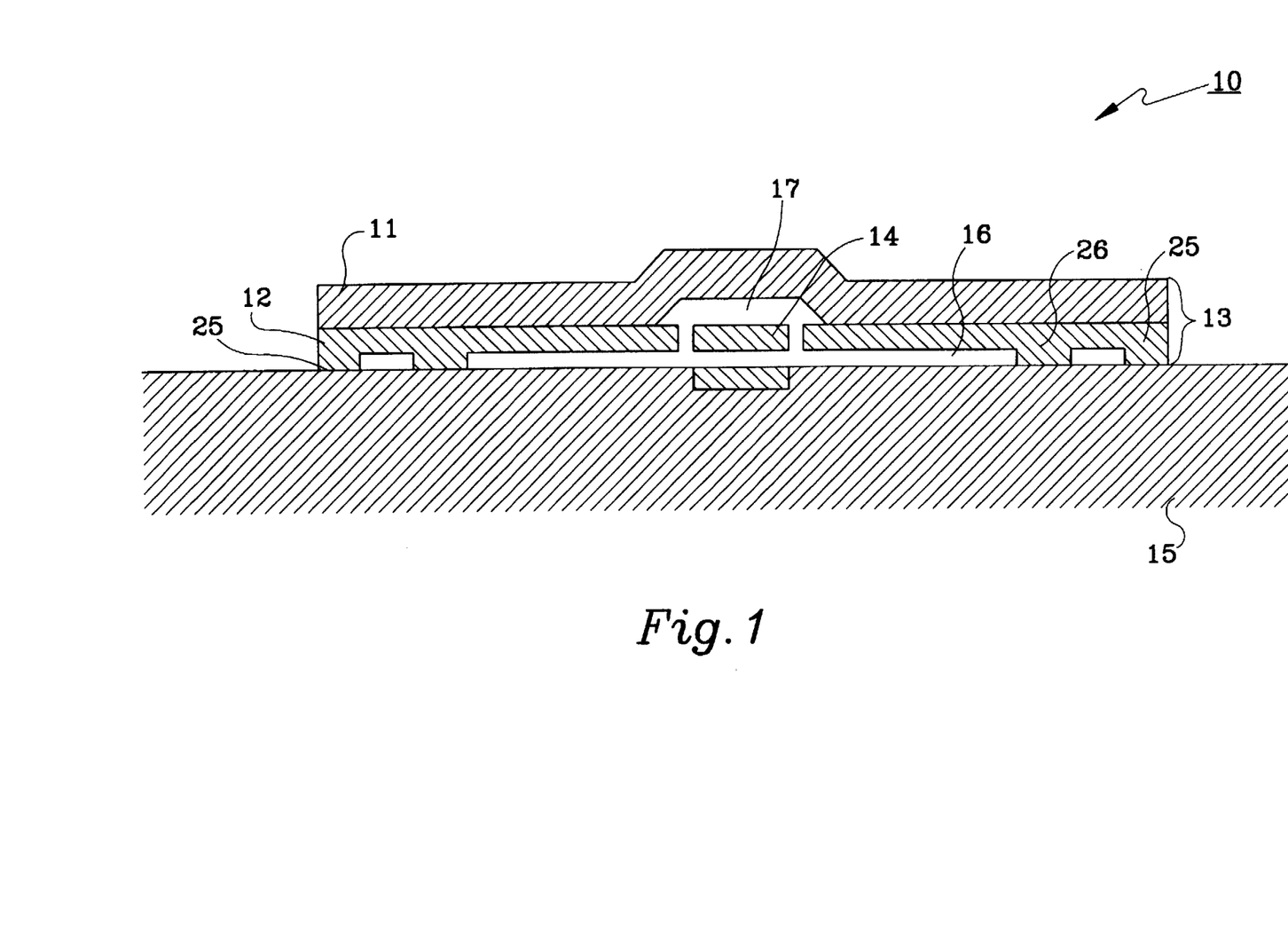
FIG. 1 shows a resonant microbeam pressure sensor.

FIG. 1 shows a cross-section of the present thin film resonant microbeam absolute pressure sensor 10. Two layers 11 and 12 of fine-grained polysilicon form pressure sensitive diaphragm 13, with a resonant member 14 formed in lower layer 12. Composite diaphragm 13 is fabricated on a silicon substrate 15. Using surface micromachining techniques, sacrificial oxides and reactive sealing, a vacuum cavity reference 16 is formed in the region between diaphragm 13 and substrate 15. Pressure applied to the topside of diaphragm 13 creates deformations into lower cavity region 16, stretching resonant microbeam 14 and causing shifts in its resonant frequency. Microbeam 14 is free to vibrate into lower cavity region 16 and into an upper cavity region 17 (also in vacuum). Optical or electrical drive mechanisms excite the microbeam into resonance and detection of the vibration provides a quasi-digital output signal which is a measure of applied pressure. Multiple resonators can be configured on a single diaphragm 13 to provide compensation for temperature and common mode effects. Diaphragm 13 can be circular or square; similarly, so can the die. An optional fabrication sequence using B:Ge codoped material provides significant stress isolation by undercutting silicon substrate 15 directly beneath the pressure sensor. Other micromachining steps can adapt resonant pressure sensor 10 to differential pressure sensor sensing applications using multiple devices or by configuring an additional pressure port.

This device has a pressure diaphragm formed from a deposited thin film of polysilicon, with an integral vacuum reference directly underneath the diaphragm. Deformations of the diaphragm with applied pressure caused resistance shifts of a Wheatstone bridge, fabricated from polysilicon piezoresistors deposited on the diaphragm. Device 10 described here has an integral vacuum cavity 16 reference and a polysilicon diaphragm 13, but has a polysilicon resonator 14 integrally formed from a portion of diaphragm 13, thus providing a frequency output that is a direct measure of pressure applied to the top surface of diaphragm 13 (see FIG. 1) which interfaces readily with digital and optical systems.

Operation of device 10 can be noted by inspecting the illustrations in FIGS. 2a, 2b, 2c and 2d. Deformations of pressure-sensitive diaphragm 13 with applied pressure (Papp) creates stress ($\sigma_{max}$) in the plane of diaphragm 13 which increases linearly with pressure, for small deflections as shown by curve 18 in FIG. 2b. The stress $\sigma$ and strain $\epsilon$ distributions in the plane of diaphragm 13, however, vary for points near the edge of diaphragm 13 or near the center. The stress (or strain) distribution at the bottom of diaphragm 13 is tensile near the center and compressive near the periphery.

Figures 2A, 2B:
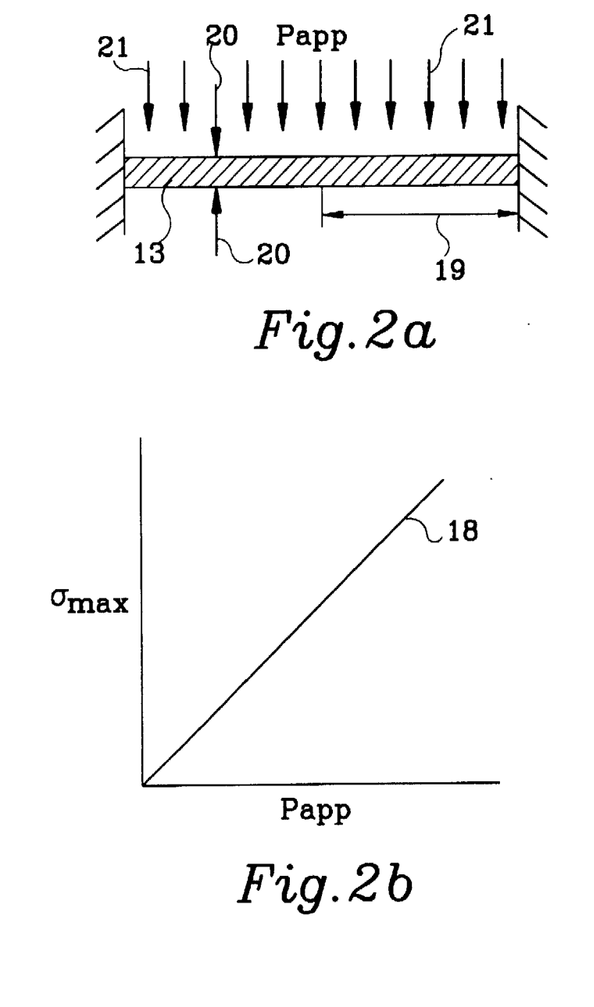
FIGS. 2a, 2b, 2c and 2d illustrate the stress effects on a pressure sensing diaphragm.
Figure 2C:
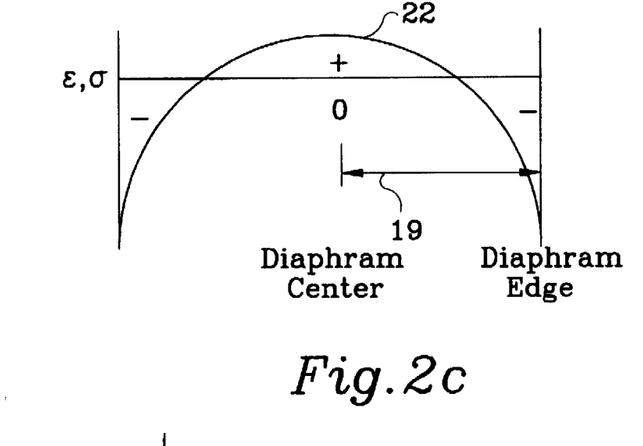
Figure 2D:
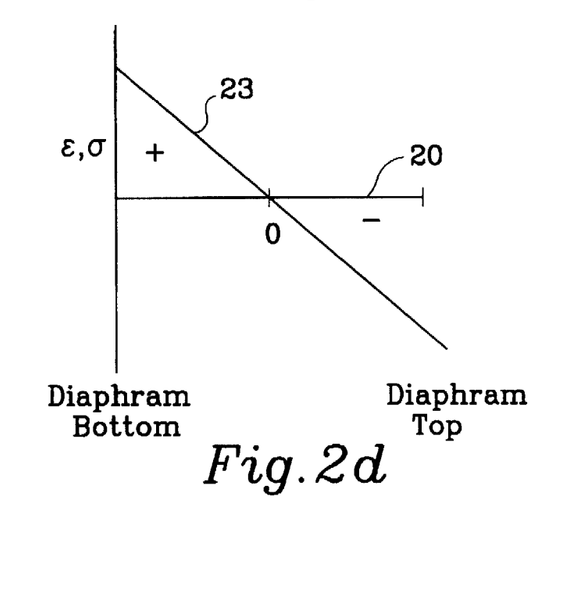

FIG. 2c shows stress and strain distributions of a diaphragm 13 based pressure sensor 10. A fully supported diaphragm 13 of radius 19 (h) and thickness 20 is shown in FIG. 2a with pressure applied to the topside. The maximum tensile stress occurs at the diaphragm 13 edge, and increases linearly with applied pressure (in FIG. 2b). The stress distribution at the bottom of the diaphragm 13 varies, according to curve 22 of FIG. 2c, from a tensile stress at the center to a compressive stress at the periphery, indicating that a resonator 14 is appropriately placed either at the diaphragm 13 center, or at the periphery. FIG. 2d shows the stress and strain profile 23 with diaphragm 13 thickness 20, with a compressive stress at the upper surface and a tensile stress at the lower surface.

Figure 3:
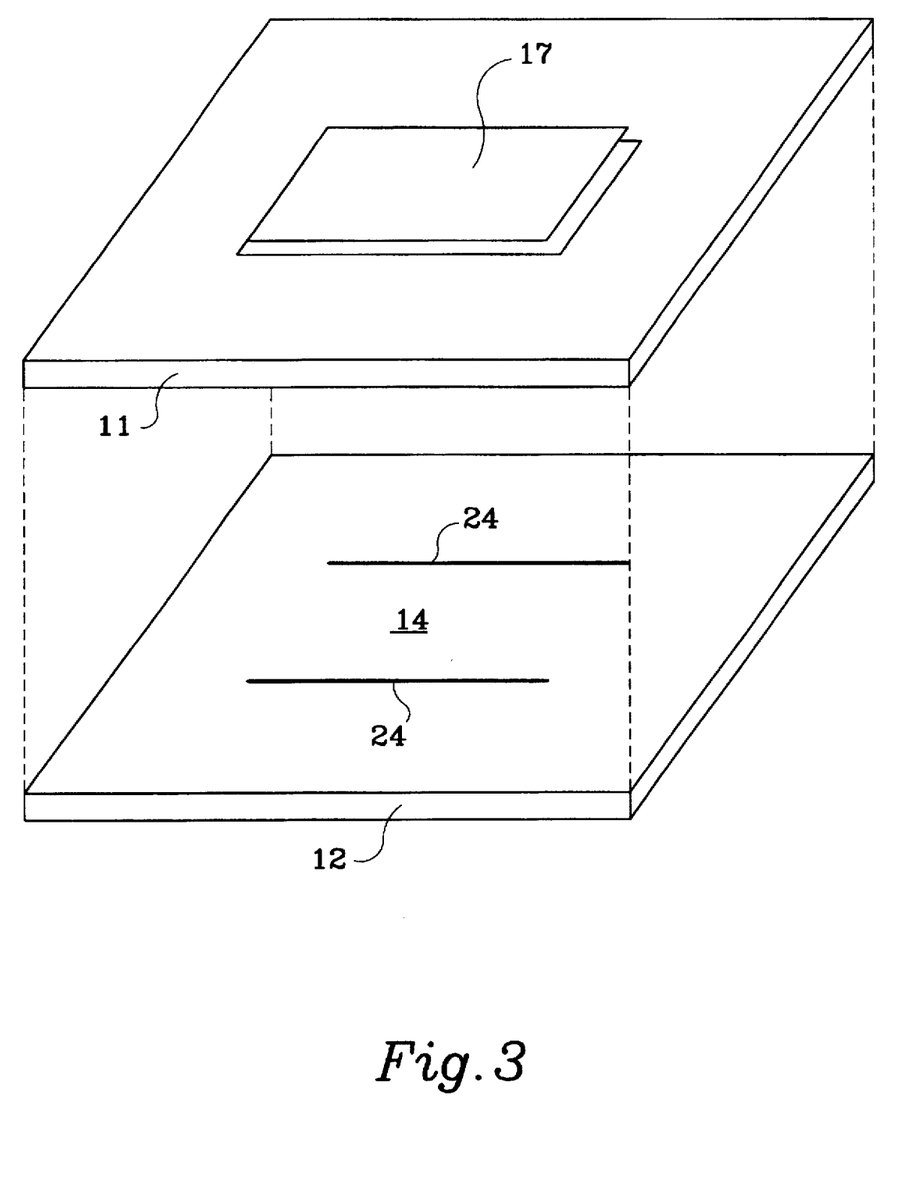
FIG. 3 is a schematic of a resonant microbeam sensor diaphragm.

Resonant pressure sensors have been designed and fabricated with resonant microbeams fabricated on single crystal silicon diaphragms. Smaller size, large signal and an integral vacuum reference 16 is obtained by the methods and innovation described here. The single crystal silicon diaphragm is replaced with a much smaller (100 to 500 micrometers) polysilicon diaphragm 13, varying from 1.0 to 5.0 micron thick. Diaphragm 13 is formed from two layers 11 and 12 of polysilicon, as shown in FIG. 3. Resonator 14 is formed by etching two slits 24 in lower (beam) polysilicon layer 12. Upper (shell) polysilicon layer 11 increases diaphragm 13 thickness and contains a small cavity 17 directly above microbeam 14 to allow it to vibrate unencumbered. Vacuum reference cavity 16 is located underneath lower polysilicon layer 12. Anchor regions 25 and 26, shown in FIGS. 1, 5 and 6, allow diaphragm 13 to replicate as closely as possible clamped boundary conditions at the periphery. These consist of relatively wide anchor regions 25 for the outside of the plate, and segmented, narrow inner regions 26 for firming the displacements at the periphery.

The number of masking levels required for resonant absolute pressure sensor 10 is six: lower cavity masking level, lower drive, channel, beam, upper cavity and shell. Additional levels are required to form paddle-style stress isolation (described below) and piezoresistive or capacitive sense.

The lower cavity mask forms region 16 for the vacuum reference and allows mechanical contact between the periphery of diaphragm 13 and underlying substrate 15 through the lower cavity sacrificial oxide. The lower drive level is used to form photodiodes 31 in substrate 15 directly beneath microbeam 14. The photodiodes will create an electric field due to the photovoltaic effect when stimulated by incident radiation and allow optical interrogation of microbeam frequencies. This layer can similarly be used to form drive or sense electrodes in substrate 15 for electrical versions. The channel layer is used to provide access 60 for liquid access of etchant to the upper and lower cavities for removal of the sacrificial material. The channels are required to be thin for sealing purposes. The beam layer is used to define resonators. The upper cavity layer is used to pattern the upper cavity oxide immediately above resonators 14. Shell layer defines diaphragm 13 and completes the vacuum enclosure for microbeam 14. The upper cavity 17, beam 14 and shell thicknesses are chosen to intensity modulate the sensing radiation for optical detection and excitation. An optional trench mask is used to define a U-shaped trench around three sides of the paddles for stress isolation.

Figure 4A:
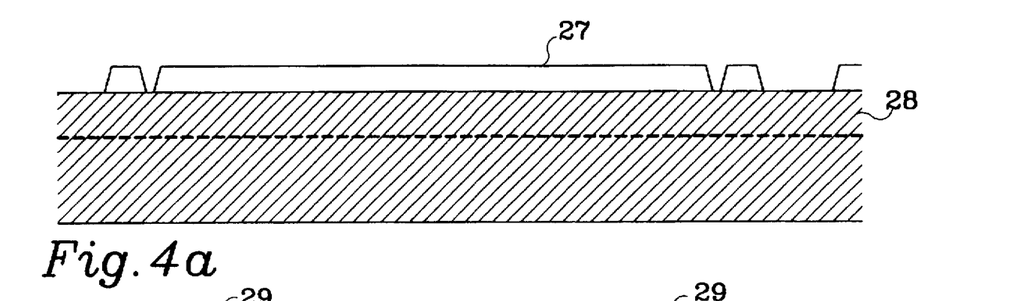
FIGS. 4a, 4b, 4c, 4d, 4e, 4f, 4g and 4h show a process for fabricating a resonant microbeam sensor.
Figure 4B:
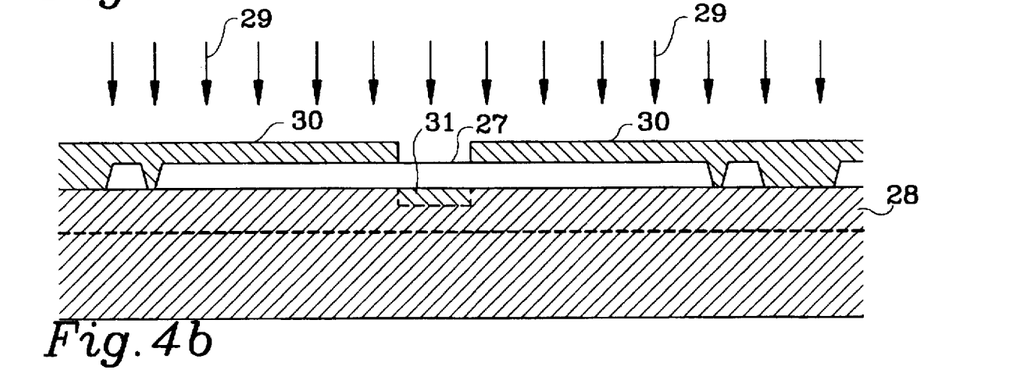
Figure 4C:
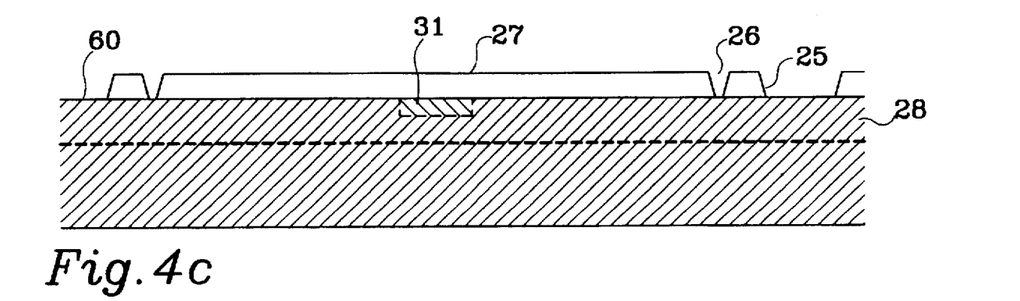
Figure 4D:
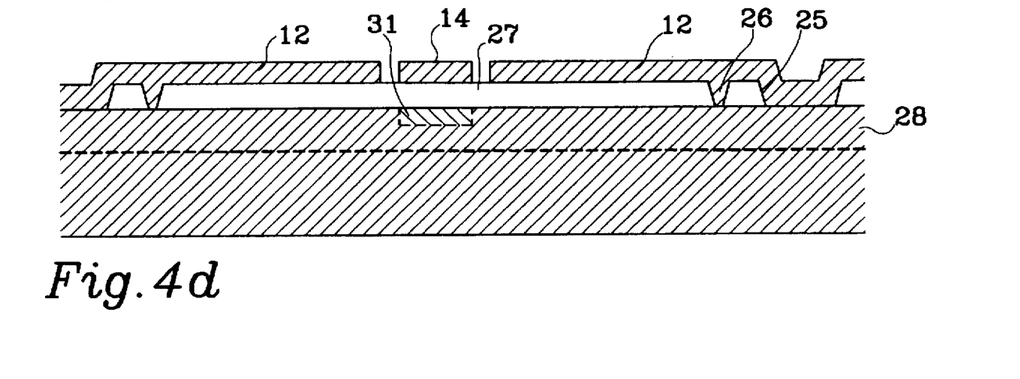
Figure 4E:
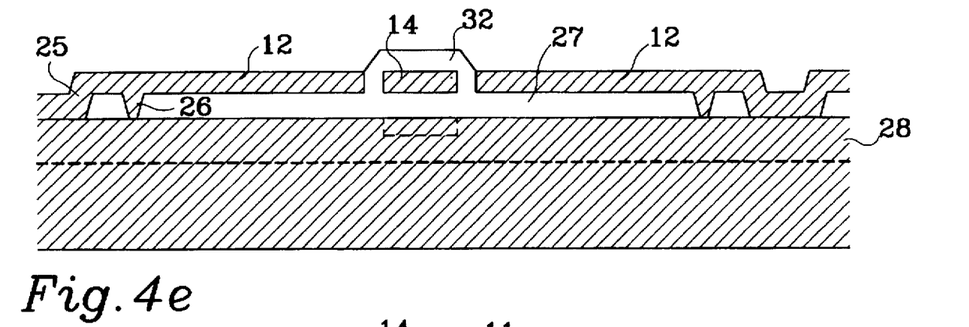
Figure 4F:
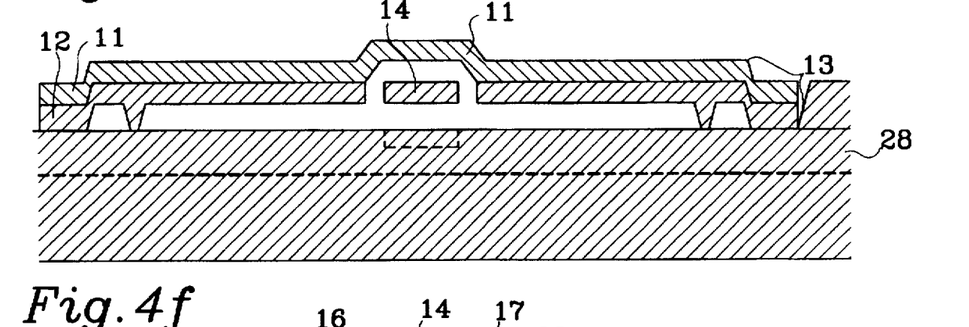
Figure 4G:
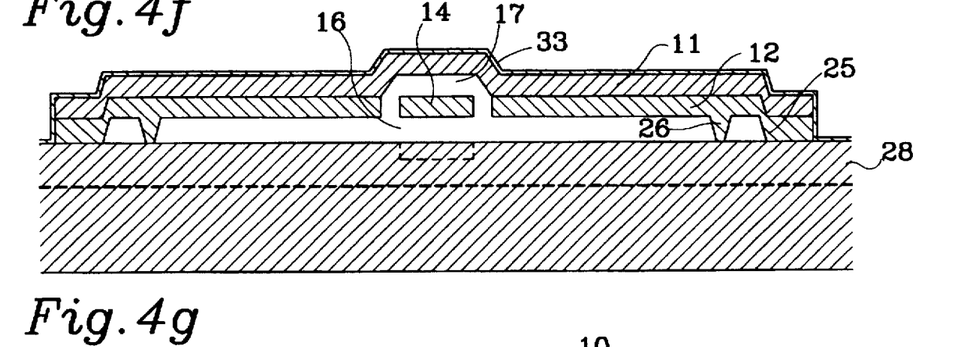
Figure 4H:
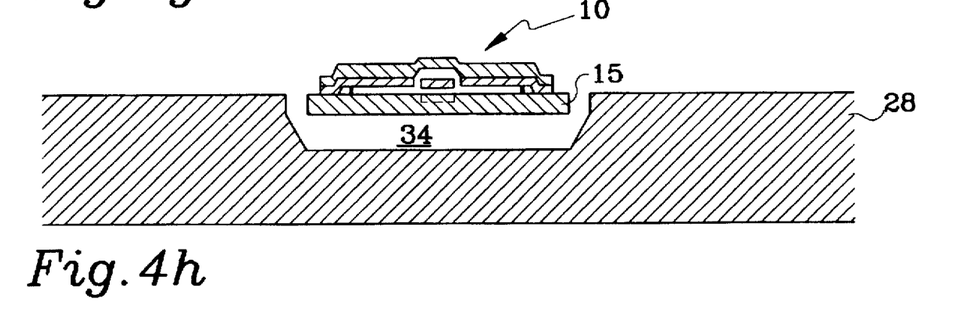

The microbeam fabrication process (see FIGS. 4a, 4b, 4c, 4d, 4e, 4f, 4g and 4h) contains three LTO deposition steps and two polysilicon deposition steps. Three implants are used; two of them are blanket implants. No thermal oxidations are required in this sequence. Silicon nitride is used for an antireflection coating and a scratch protection layer. Processing of optically resonant microbeams 14 begins with a nominally 7500 angstrom deposition of LTO 27 (i.e., low temperature oxide) on a silicon wafer 28 in FIG. 4a. Wafers 28 are n- or p-type with (optional) inclusion of an epitaxial layer on top of a codoped B:Ge etch stop layer. LTO 27 is patterned and etched using the lower cavity masking level to anchor diaphragm 13 to substrate 15 and define the vacuum cavity reference region. An implant 29 is done through oxide 27 with a PR mask 30 of the lower drive layer to form p-n junctions 31 in substrate 28 of FIG. 4b. A thin, nominally 800 angstrom LTO layer is deposited and patterned with the channel layer to form etch channels 60 to and through the anchor regions 25 and 26 of FIG. 4c. A beam polysilicon layer 12 is deposited next, followed by an implant, patterning and etching to define beams 14 and remove beam polysilicon layer 12 in the region between beam polysilicon layer 12 and beam 14 as shown in FIG. 4d. The thickness of beam polysilicon layer 12 is targeted at nominally 1.0 micrometer. A nominally 7500 angstrom LTO layer 32 is deposited conformally over microbeam 14 in FIG. 4e. The LTO is patterned with the upper cavity layer and etched to form cavity region 17 around the microbeam 14. A thicker shell polysilicon layer 11 (at 1.0 to 4.0 micrometers) is deposited and implanted in FIG. 4f, followed by an intermediate temperature anneal to set the strain field and drive the implant. Shell polysilicon layer 11 and beam polysilicon layer 12 are then patterned and etched using the shell layer to form diaphragm 13. A sacrificial etch is applied to remove LTO 27 and 32 thereby resulting in cavities 16 and 17, as shown in FIG. 4g. Sacrificial etching 34 is done using 1:1 HF:HCl, followed by withdrawal and the latest sublimation techniques. A thin layer of LTO is deposited followed by a 1600 angstrom layer of polysilicon to seal in a vacuum and form the reactive seal. Alternatively, silicon nitride may be used for sealing, or a polysilicon seal with the oxide omitted. A nominally 1000 angstrom thick passivation layer 33 of silicon nitride is deposited, to enhance the seal and performing an additional function as an antireflection coating.

Stress isolation can be added by forming paddles upon which the absolute pressure sensor is located. A layer of LTO is deposited, patterned and etched with the trench layer, followed by etching of the silicon nitride layer and silicon through the epitaxial layer. An additional layer of LTO is deposited for sidewall passivation during anisotropic etching. The LTO is blanket etched from the top side, leaving oxide on the exposed sides of the n-epitaxial layer. After anisotropic etching in EDP, the LTO passivation layers are removed.

Figure 5:
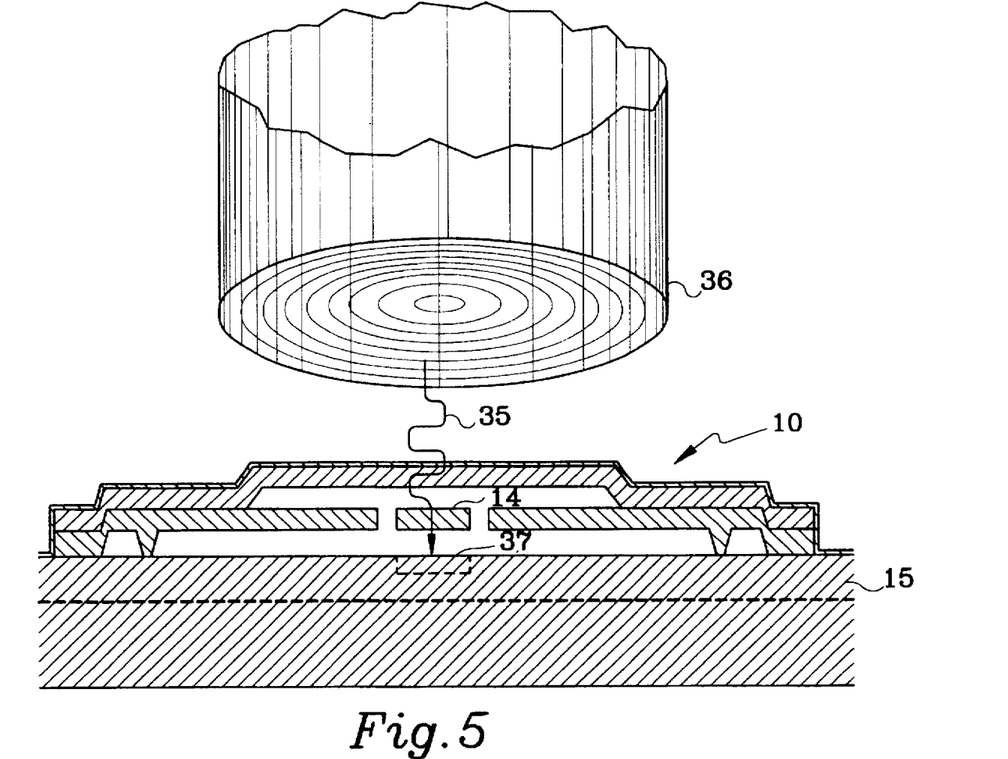
FIG. 5 reveals an optically driven resonant microbeam sensor.

Optical methods may be used to drive and sense the oscillations of a resonant microbeam 14 using an optical fiber 36. FIG. 5 shows an optically driven/sensed thin film resonant absolute pressure sensor. Light 35 from optical fiber 36 is trained on resonator 14. A portion of light 35 is transmitted through shell layer 11 and the beam 14 layer, striking an underlying photodiode 37. Light 35 generates an electric field, forcing microbeam 14 downward. Modulation of incident light 35 at the resonant frequency excites beam 14, and results in a reflection of light 35 back through fiber 36 which is also modulated and sensed externally with a photodiode. A second method of excitation uses the self-resonant approach and operates with continuous wave incident light 35.

Figure 6:
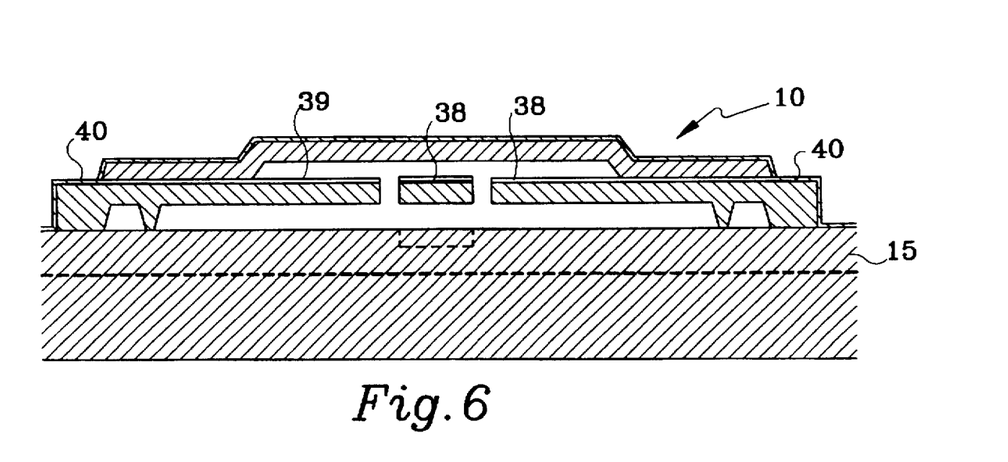
FIG. 6 illustrates an electrically driven resonant microbeam sensor having an electrostatic drive line and a piezoresistive sense line.
Figure 7A:
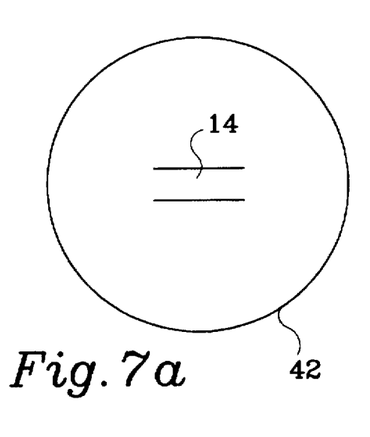
FIGS. 7a, 7b, 8a and 8b show single and multiple resonator configurations, respectively.
Figure 7B:
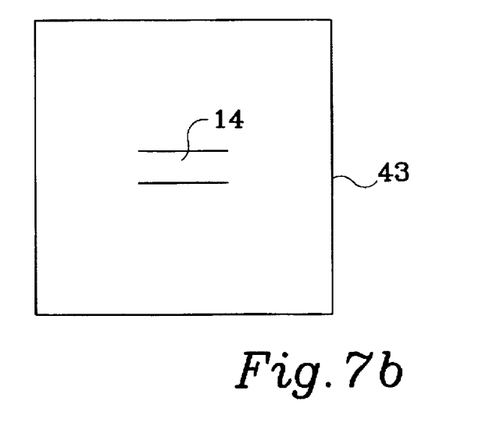
Figure 8A:
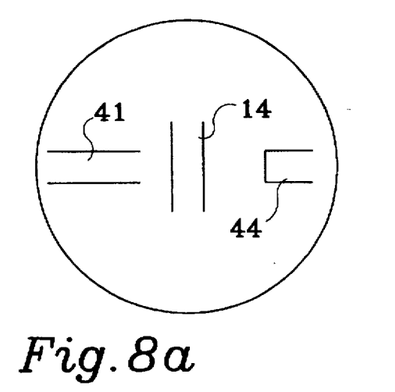
Figure 8B:
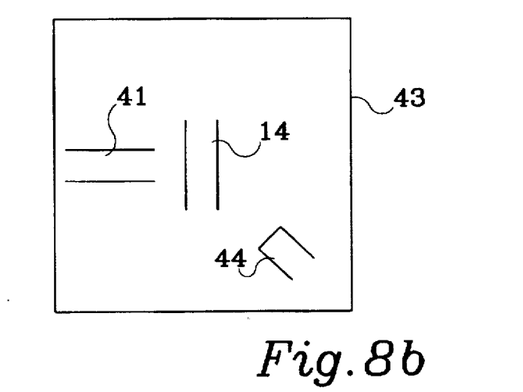

Electrical drive/sense methods may be used to electrostatically excite the microbeam and piezoresistively sense the deflections. FIG. 6 shows an electrostatic drive line 38 and sensing piezoresistors with leadouts 40 for external electrical interconnection. Although single resonators 14 can be used to extract pressure readings, larger signals and a reduction in temperature sensitivity can be obtained using multiple resonators in a push-pull configuration. Cantilevered microbeam temperature sensors can be for temperature compensation. FIGS. 7a and 7b, and 8a and 8b show single and multiple resonator configurations, respectively. A single resonator 14 on a circular diaphragm 42 is shown schematically in FIG. 7a and on a square diaphragm 43 in FIG. 7b. Multiple resonators 14, 41 and 44 on a circular diaphragm 42 are shown schematically in FIG. 8a and on a square diaphragm FIG. 8b.

Figure 9A:
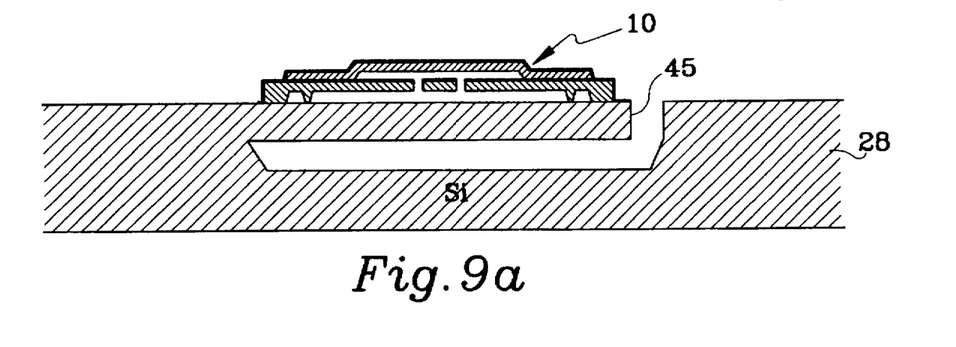
FIGS. 9a and 9b reveal a stress isolating mounting for a resonant microbeam sensor.

Coupling to thin film resonators 14 using optical methods, for example, can induce undesirable packaging and mounting stresses on sensor 10, causing baseline shifts and hysteresis. A method for achieving stress isolation is to mount sensing devices 10 on a suspended paddle 45 of a substrate 28, in a side view of FIG. 9a, which appreciably reduces the effects of detrimental stresses. Sensor 10 is formed on substrate 28 prior to formation of paddle 45.

Figure 9B:
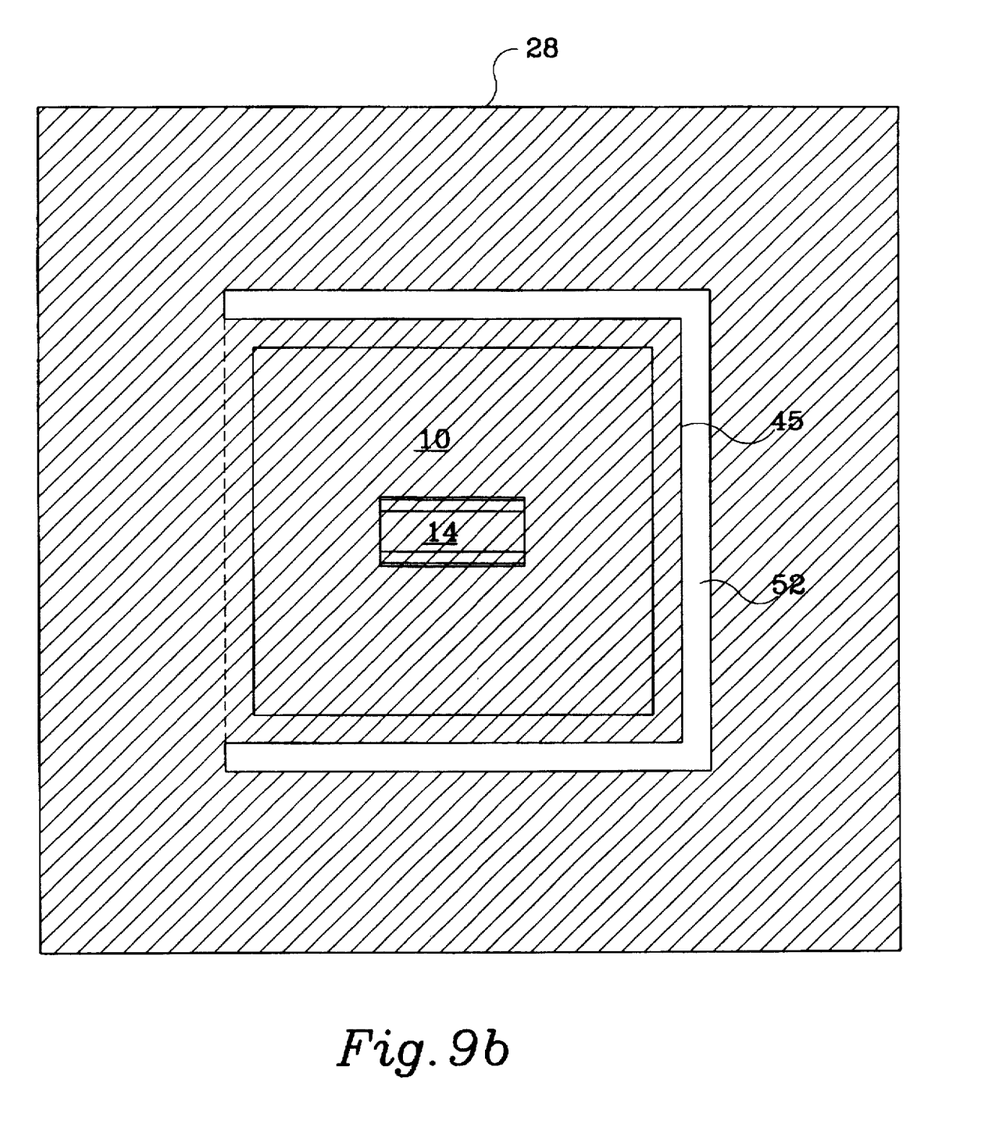

FIG. 9b shows top view of stress isolated resonant microbeam absolute pressure sensor 10 on paddle 45 of substrate 28. The stress isolation results from positioning device 10 on a single crystal silicon paddle 45, suspended away from the mounting surfaces. Circular or square diaphragms can be mounted on paddle 45. A trench 52 parts three sides of paddle 45 from die 28. A square die 28 is illustrated, though it can also be circular.

Figure 10A:
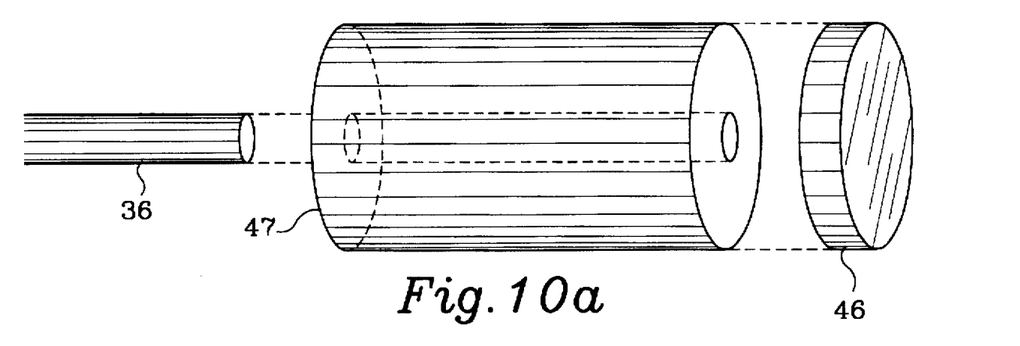
FIGS. 10a, 10b and 10c illustrate a resonant microbeam sensor having a fiber optic drive and sense mechanism.
Figure 10B:
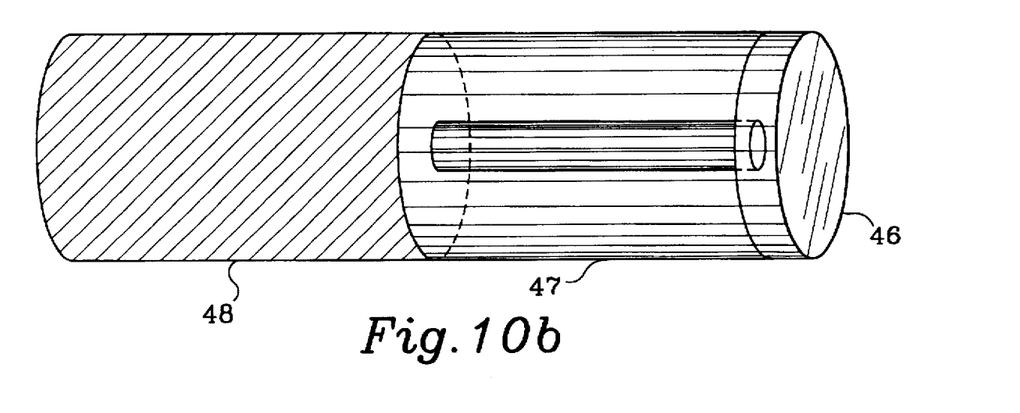
Figure 10C:
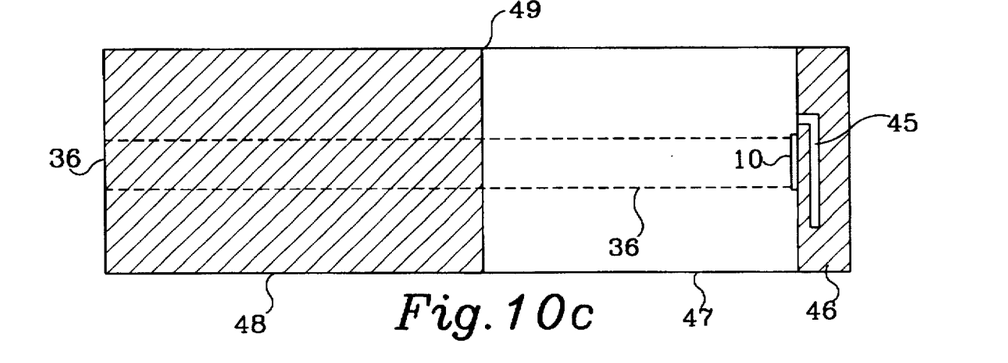

A packaging configuration using an optical fiber 36 mounted to a silicon pressure sensor 10 die 46 is illustrated in FIGS. 10a, 10b and 10c. An optical fiber 36 is threaded through a glass or ceramic ferrule 47, which may have funnels on one or both ends. Ferrule 47 is attached to silicon die 46 which may be either square or round. A round die may be formed by using through-the-wafer etching techniques. A cladding 48 surrounds optical fiber 36. Optical fiber 36 is used to drive and sense microbeam 14. Interface 49 provides for strain relief. A pressure port is cut into glass ferrule 47 or silicon die 46. Other sensor functions (temperature, strain, magnetic field, and so forth) can be measured using this packaging approach with alternate configurations.

Figure 11A:
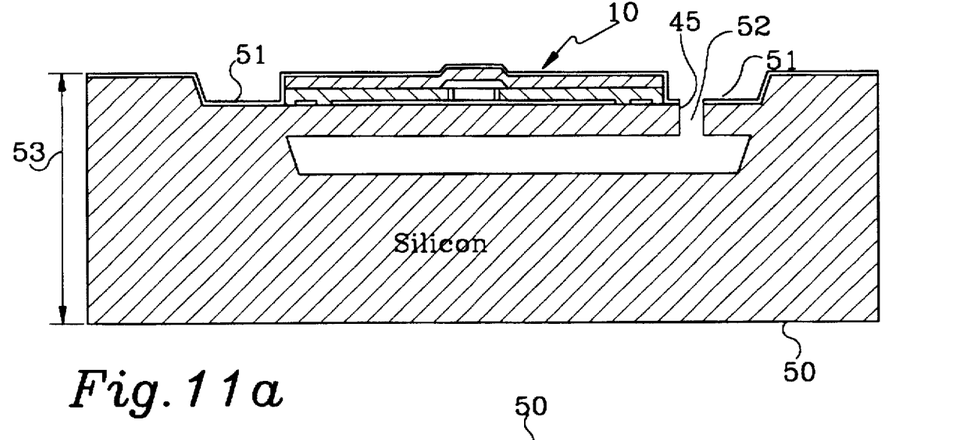
FIGS. 11a and 11b show a recessed stress isolating mounting for a microbeam sensor.
Figure 11B:
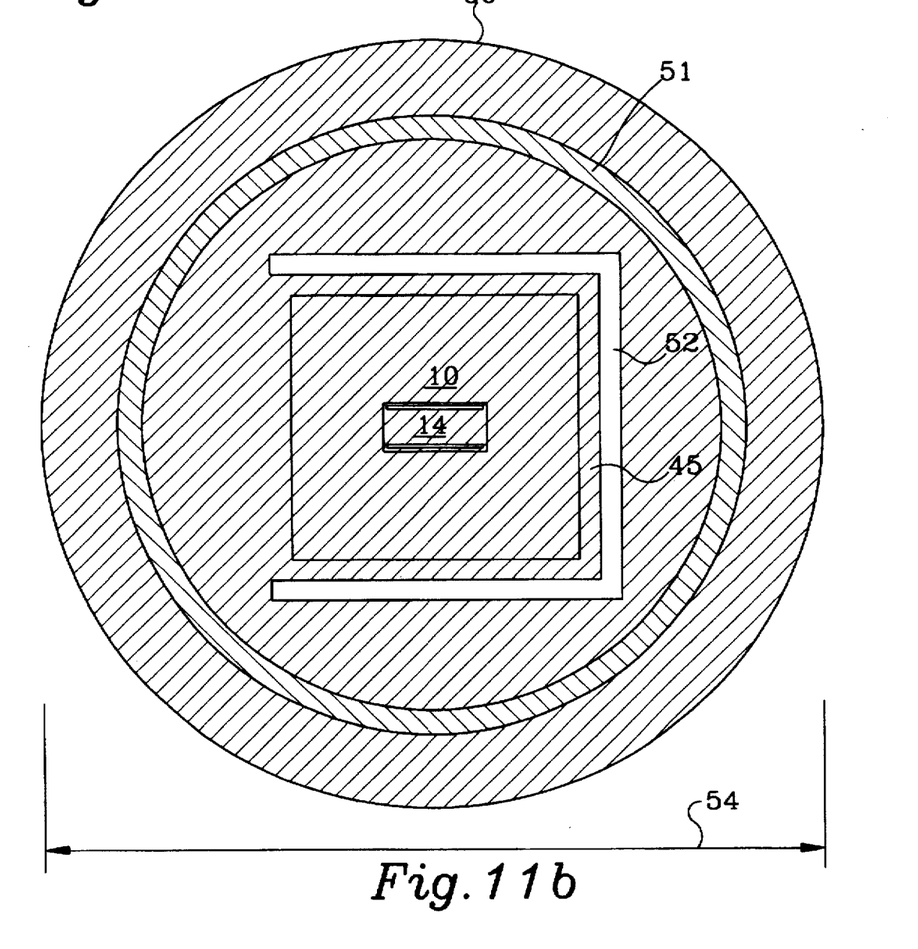

A resonant microbeam absolute pressure sensor 10 may be situated on a circular die 50. Side and top views of this configuration are shown in FIGS. 11a and 11b, respectively. Resonant pressure sensor 10 is built in a recess 51, to allow connection to a flat-faced ferrule 47 or cleaved fiber 36. Sensor 10 is on paddle 45 that is suspended apart from die 50 by trench 52. Dimensions 53 and 54 may be from 0.25 to 0.5 millimeter and from 0.5 to 2.5 millimeters, respectively.

We claim:

1. A method for making a thin film resonant microbeam sensor, comprising:

forming a first low temperature oxide layer on a silicon substrate;

masking the first low temperature oxide layer;

etching the first low temperature oxide layer to define a vacuum cavity reference region and anchor regions;

forming a first polysilicon layer on the low temperature oxide layer;

forming a second low temperature oxide layer on the first low temperature oxide layer and the silicon substrate;

masking the second low temperature oxide layer to define the channel layer to form at least one etch channel to and through the vacuum cavity reference anchor regions;

etching the second low temperature oxide layer;

forming a first polysilicon layer on the channel layer;

forming a masking layer on the first polysilicon layer to define at least one beam;

etching the second polysilicon layer to form the at least one beam;

forming a third low temperature oxide over the at least one beam;

masking the third low temperature layer to define an upper cavity over the beam;

etching the third low temperature oxide layer to form the upper cavity;

forming a third polysilicon layer on the second polysilicon layer and on the remaining third low temperature layer; and applying sacrificial etch to remove the remaining portions of the first, second and third low temperature oxide layers.

2. The method of claim 1 wherein the sacrificial etch is applied through the at least one etch channel.

3. The method of claim 1 further comprising:

masking the first low temperature oxide layer, prior to forming the second low temperature oxide layer, for defining an area on the silicon substrate; and implanting the area on the silicon substrate, prior to forming the second low temperature oxide layer, for forming at least one p-n junction in the silicon substrate.

4. The method of claim 1 wherein the resonant microbeam sensor is formed on a paddle-like portion of the silicon substrate.

5. A method for making a thin film resonant microbeam sensor, comprising:

depositing an approximately 7500 angstrom first low temperature oxide layer on a silicon wafer;

masking the first low temperature oxide layer with a pattern;

etching the first low temperature oxide layer to define a lower cavity and anchor regions;

removing the masking from the first low temperature oxide layer;

masking the first low temperature oxide layer to provide a defined area over the silicon wafer for a p-n junction;

implanting through the defined area of the first low temperature oxide to form a p-n junction in the silicon wafer;

removing the masking from the first low temperature layer;

depositing an approximately 800 angstrom second low temperature oxide on the first low temperature layer;

masking the second low temperature oxide layer to define etch channels to and through the anchor regions;

etching the second low temperature oxide layer to form the etch channels;

removing the masking from the second low temperature oxide layer;

forming an approximately one micron first polysilicon layer on the second low temperature oxide layer;

implanting the beam polysilicon layer;

implanting the beam polysilicon layer with a pattern that defines a resonant beam;

etching the polysilicon layer to form the resonant beam;

depositing an approximately 7500 angstrom third low temperature oxide layer over the polysilicon layer;

masking the third low temperature oxide to define an upper cavity proximate to the resonant beam;

etching the third low temperature layer to form the upper cavity proximate to the resonant beam;

removing the masking from the third low temperature layer;

depositing a one to four micron second polysilicon layer on the third low temperature oxide layer;

annealing the first and second polysilicon layers to each other to form a diaphragm;

etching the second low temperature oxide layer to open up the etch channels to the first and third low temperature oxide layers; and applying a sacrificial etch to remove the first and third low temperature oxide layers and result in the lower cavity and upper cavity proximate to the resonant beam, and the anchor regions.

6. The method of claim 5 wherein a 1:1 HF:HCL solution is used as the sacrificial etch.

7. The method of claim 6 further comprising:

depositing a fourth low temperature oxide on the first and second polysilicon layers and on the silicon wafer; and depositing an approximately 1600 angstrom third polysilicon layer on the fourth low temperature oxide layer.

8. The method of claim 7 further comprising depositing a third layer of polysilicon on the first and second polysilicon layers and the silicon wafer.

9. The method of claim 8 further comprising etching the silicon wafer so that the resonant microbeam sensor is mounted on a paddle attached to the silicon wafer on one side of paddle wafer for stress isolation of the microbeam sensor.

10. The method of claim 9 wherein the microbeam is formed by etching two approximately parallel slits in the beam polysilicon layer.

11. A method for making a thin film resonant microbeam sensor, comprising:

forming a first layer on a substrate to define a first cavity;

forming a second layer on the first layer to define a channel;

forming a third layer on the second layer;

removing portions of the third layer to form a resonant microbeam;

forming a fourth layer on the third layer to define a second cavity;

forming a fifth layer on the fourth layer;

removing the second layer to form a channel to the first and fourth layers;

removing the first and fourth layers via the channel to result in the first and second cavities proximate to the resonant microbeam;

removing air from the first and second cavities;

sealing the first and second cavities such that air cannot enter the cavities; and forming optical drive and sense means prior to forming the second layer; and wherein:

the substrate comprises silicon;

the third and fifth layers comprise polysilicon;

the third and fifth layers are annealed at areas of contact of the third and fifth layers;

the resonant microbeam can vibrate in directions that extend into the first and second cavities; and the resonant microbeam has a resonant frequency of vibration that varies upon application of pressure to the fifth layer, such that the resonant frequency is an indication of the amount of pressure applied to the fifth layer.

12. The method of claim 11 further comprising implanting a p-n junction in the substrate prior to forming the second layer.

13. The method of claim 11 further comprising removing portions of the third layer to form at least a second microbeam.

14. A method for making a thin film resonant microbeam sensor, comprising:

forming a first layer on a substrate to define a first cavity;

forming a second layer on the first layer to define a channel;

forming a third layer on the second layer;

removing portions of the third layer to form a resonant microbeam;

forming a fourth layer on the third layer to define a second cavity;

forming a fifth layer on the fourth layer;

removing the second layer to form a channel to the first and fourth layers;

removing the first and fourth layers via the channel to result in the first and second cavities proximate to the resonant microbeam;

removing air from the first and second cavities;

sealing the first and second cavities such that air cannot enter the cavities; and removing portions of the substrate such that the resonant microbeam sensor is mounted on a cantilevered paddle-like portion of the substrate for stress isolation of the microbeam sensor; and wherein:

the substrate comprises silicon;

the third and fifth layers comprise polysilicon;

the third and fifth layers are annealed at areas of contact of the third and fifth layers;

the resonant microbeam can vibrate in directions that extend into the first and second cavities; and the resonant microbeam has a resonant frequency of vibration that varies upon application of pressure to the fifth layer, such that the resonant frequency is an indication of the amount of pressure applied to the fifth layer.

15. A method for making a thin film resonant microbeam sensor, comprising:

forming a first layer on a substrate to define a first cavity;

forming a second layer on the first layer to define a channel;

forming a third layer on the second layer;

removing portions of the third layer to form a resonant microbeam;

forming a fourth layer on the third layer to define a second cavity;

forming a fifth layer on the fourth layer;

removing the second layer to form a channel to the first and fourth layers;

removing the first and fourth layers via the channel to result in the first and second cavities proximate to the resonant microbeam;

removing air from the first and second cavities; and sealing the first and second cavities such that air cannot enter the cavities; and wherein:

the substrate comprises silicon;

the third and fifth layers comprise polysilicon;

the first, second and fourth layers comprise low temperature oxide;

the third and fifth layers are annealed at areas of contact of the third and fifth layers;

the resonant microbeam can vibrate in directions that extend into the first and second cavities; and the resonant microbeam has a resonant frequency of vibration that varies upon application of pressure to the fifth layer, such that the resonant frequency is an indication of the amount of pressure applied to the fifth layer.

16. The method of claim 15 wherein the first, second and fourth layers may be removed with a 1:1 HF:HCL solution.

17. A method for making a thin film microbeam sensor, comprising:

forming a first layer on a substrate to define a first cavity;

forming optical drive and sense means;

forming a second layer on the first layer to define a channel;

forming a third layer on the second layer;

removing portions of the third layer to form a microbeam;

forming a fourth layer on the third layer to define a second cavity;

forming a fifth layer on the fourth layer;

removing the second layer to form a channel to the first and fourth layers; and removing the first and fourth layers via the channel to result in the first and second cavities proximate to the microbeam.

18. The method of claim 17 wherein:

the substrate comprises silicon; and the third and fifth layers comprise polysilicon.

19. The method of claim 18 wherein the third and fifth layers are annealed at areas of contact of the third and fifth layers.

20. The method of claim 19 further comprising:

removing air from the first and second cavities; and sealing the first and second cavities such that air cannot enter the cavities.

21. The method of claim 20 wherein:

the microbeam can vibrate in directions that extend into the first and second cavities; and the microbeam has a resonant frequency of vibration that varies upon application of pressure to the fifth layer, such that the resonant frequency is an indication of the amount of pressure applied to the fifth layer.

22. A method for making a thin film microbeam sensor, comprising:

forming a first layer on a substrate to define a first cavity;

forming a second layer on the first layer to define a channel;

forming a third layer on the second layer;

removing portions of the third layer to form a microbeam;

forming a fourth layer on the third layer to define a second cavity;

forming a fifth layer on the fourth layer;

removing the second layer to form a channel to the first and fourth layers;

removing the first and fourth layers via the channel to result in the first and second cavities proximate to the microbeam; and removing portions of the substrate such that the microbeam sensor is mounted on a cantilevered paddle-like portion of the substrate for stress isolation of the microbeam sensor.

23. The method of claim 22 wherein:

the substrate comprises silicon; and the third and fifth layers comprise polysilicon.

24. The method of claim 23 wherein the third and fifth layers are annealed at areas of contact of the third and fifth layers.

25. The method of claim 24 further comprising:

removing air from the first and second cavities; and sealing the first and second cavities such that air cannot enter the cavities.

26. The method of claim 25 wherein:

the microbeam can vibrate in directions that extend into the first and second cavities; and the microbeam has a resonant frequency of vibration that varies upon application of pressure to the fifth layer, such that the resonant frequency is an indication of the amount of pressure applied to the fifth layer.

27. A method for making a thin film microbeam sensor, comprising:

forming a first layer on a substrate to define a first cavity;

forming a second layer on the first layer to define a channel;

forming a third layer on the second layer;

removing portions of the third layer to form a microbeam;

forming a fourth layer on the third layer to define a second cavity;

forming a fifth layer on the fourth layer;

removing the second layer to form a channel to the first and fourth layers;

removing the first and fourth layers via the channel to result in the first and second cavities proximate to the microbeam; and wherein the first, second and fourth layers comprise low temperature oxide.

28. The method of claim 27 wherein:

the substrate comprises silicon; and the third and fifth layers comprise polysilicon.

29. The method of claim 28 wherein the third and fifth layers are annealed at areas of contact of the third and fifth layers.

30. The method of claim 29 further comprising:

removing air from the first and second cavities; and sealing the first and second cavities such that air cannot enter the cavities.

31. The method of claim 30 wherein:

the microbeam can vibrate in directions that extend into the first and second cavities; and the microbeam has a resonant frequency of vibration that varies upon application of pressure to the fifth layer, such that the resonant frequency is an indication of the amount of pressure applied to the fifth layer.

* * * * *